Figure 1:
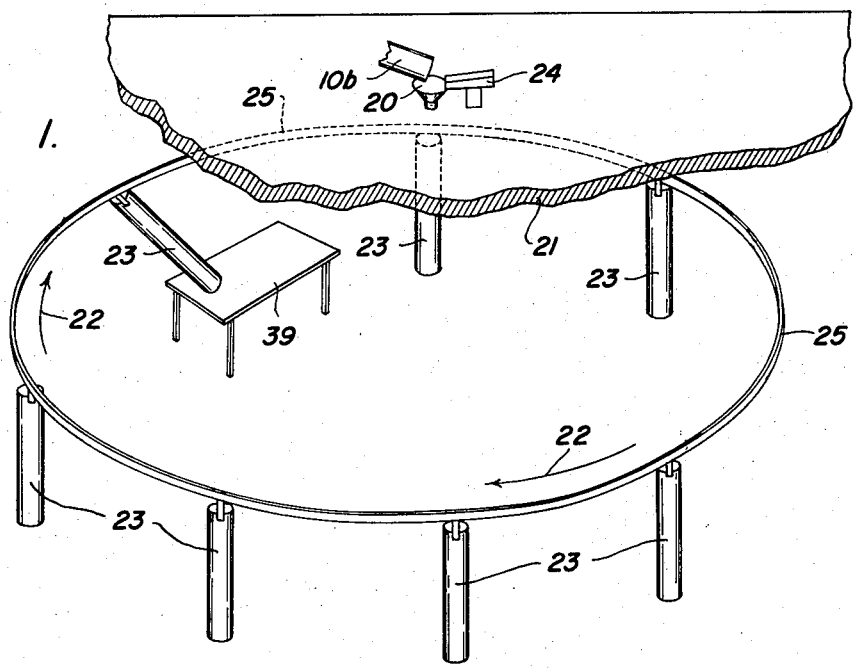

Jan. 13, 1959     D. H. MANWARING     2,868,651
PROCESS AND APPARATUS FOR MAKING CHEESE
Filed Aug. 19, 1954     2 Sheets-Sheet 1

Inventor:
DAVID H. MANWARING,
Attorneys

Jan. 13, 1959 D. H. MANWARING 2,868,651
PROCESS AND APPARATUS FOR MAKING CHEESE
Filed Aug. 19, 1954 2 Sheets-Sheet 2

Inventor:
DAVID H. MANWARING,

# United States Patent Office 2,868,651
Patented Jan. 13, 1959

2,868,651

PROCESS AND APPARATUS FOR MAKING CHEESE

David H. Manwaring, Rexburg, Idaho, assignor to Nelson-Ricks Creamery Company, Salt Lake City, Utah, a corporation of Utah Application August 19, 1954, Serial No. 450,985

6 Claims. (Cl. 99—116)

This invention relates to processes of semi-continuous nature useful in the production of various types of cheese. It relates, also, to apparatus for carrying out such processes.

Many type of cheese, particularly those of granular curd process variety, have been produced for years by procedures necessitating considerable manual labor and supervision. While continuous and semi-continuous procedures have been suggested heretofore, none have so far been used to any appreciable extent.

The principal purpose of the invention is to facilitate customary cheese making operations, by providing a new way of handling the curd following its formation in a customary vat and carrying on through the stages of curd and whey separation and curd compaction, resulting in the filling of customary dressed cheese hoops in record time and with a minimum of labor and supervision.

As against customary vat practices, the invention affords a more even distribution of salt throughout the curd and considerable savings in both time and labor. It enables a greater volume of production to be achieved with a lesser number of vats, and produces a cheese of better body and of higher quality in general.

In accordance with the invention, the customary raw materials are introduced into a standard vat, and are cooked and cut or cubed in the usual manner. The resulting curds and whey are, however, passed directly from the vat to a revolving, elongate and perforated drum for gradual traversal of the length thereof, during which time the whey drains from the curds while the discrete character of the curds is substantially preserved. This prevents matting and clumping or balling of curd, which is passed to a salting stage in the form of a continuous flow of curds.

Salting of the curds is carried out in a continuous manner by progressively introducing a continuous stream of salt into the continuous flow of curds, while depositing the latter in a vertically disposed, elongate, tubular forming receptacle under the influence of gravity. The simultaneous fall of curds and salt within the tubular receptacle produces a uniformity of salting not possible heretofore.

The salted curd is permitted to settle and knit within the forming tube, which is advantageously sparsely perforated to permit exudation of any whey carried over from the earlier stage. When satisfactorily formed, the cheese is removed through the bottom of the tubular receptacle in successive cross-sectional increments, usually by slicing off portions of suitable thickness as the well formed and knit mass emerges.

By making the tubular receptacle of the same cross-section as the standard dressed cheese hoop and cutting off increments of suitable thickness, the so formed cheese pieces may be easily inserted directly into respective hoops for further processing in the usual manner, thereby eliminating the usual first pressing procedure in the press in the hoops.

The apparatus phase of the invention involves, besides the basic equipment indicated above, a correlated mounting and arrangement of equipment designed to carry out the process to best advantage.

Further objects and features of the invention will become apparent from the following detailed description of the particular preferred apparatus illustrated in the accompanying drawings by way of example.

Figure 4:
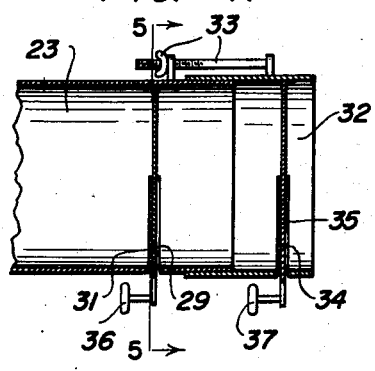
Figure 5:
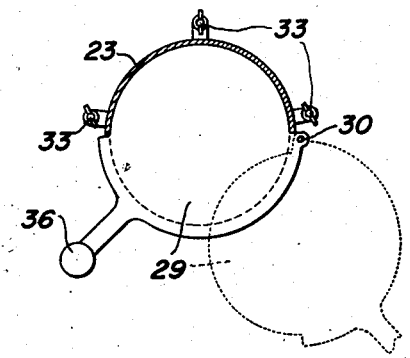
Figure 2:
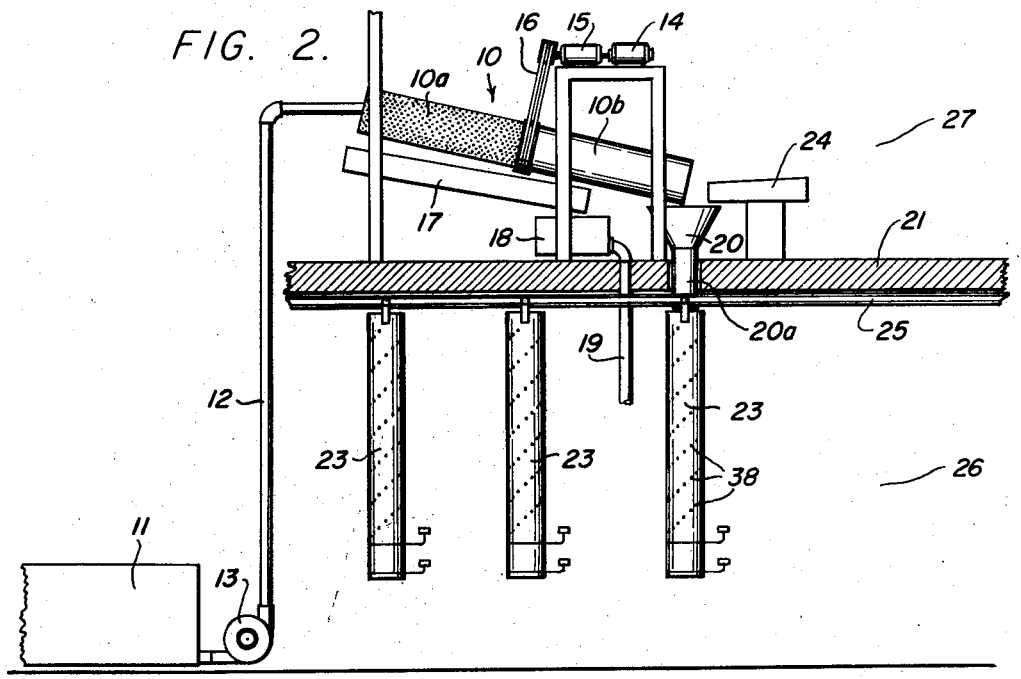
Figure 3:
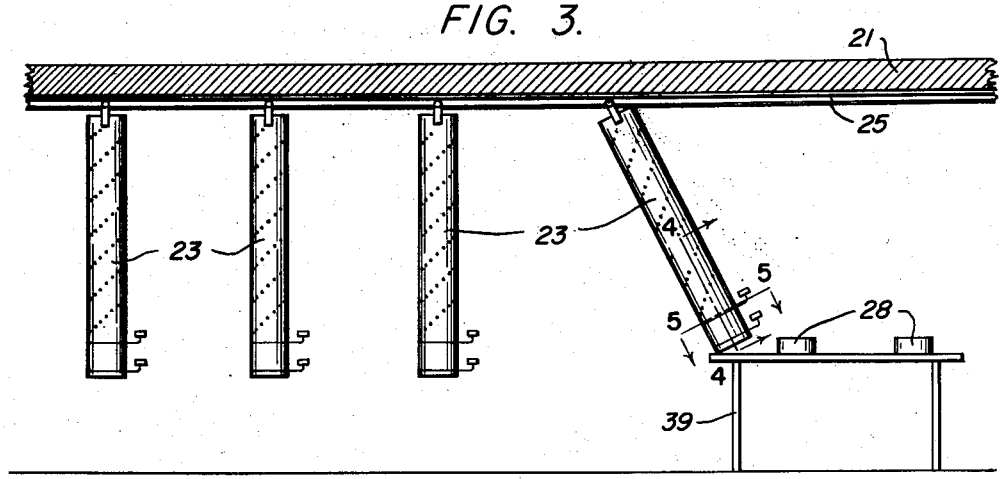

In the drawings:

Fig. 1 represents a view in perspective of a typical layout of apparatus of the invention comprehending two floors of a cheese-making plant, portions of the floor structure being broken away to reveal the correlated arrangement of structure;

Fig. 2, a fragmentary side elevation showing important correlated operative portions of the apparatus of Fig. 1, the view being drawn to a somewhat enlarged scale and being largely diagrammatic in character;

Fig. 3, a view similar to that of Fig. 2, but showing the stage of cutting off hoop-fitting pieces from the mass of completely formed and knit cheese in the tubular forming receptacle;

Fig. 4, a fragmentary vertical section taken on the line 4—4 of Fig. 3, and drawn to a somewhat larger scale in order to show details of the preferred cut-off mechanism; and Fig. 5, a transverse section taken on the line 5—5 of Fig. 4.

Referring now to the drawings:

While the process of the invention represents a semi-continuous procedure with respect to the cheese-making operation as a whole, it represents a fully continuous procedure from the standpoint of curd and whey handling through the stages of separation thereof and salting of the curd. In this way, elimination of whey from the curds and salting of the thus prepared curds are accomplished to best advantage so far as both efficiency of the operation and quality of the resulting product are concerned.

For maximum efficiency in the separation of the whey from the curds, an elongate, revolving drum 10 is employed. Such drum is advantageously formed of stainless steel with an advance, densely perforated section 10a, into the forward end of which the curds and whey are passed from a customary vat 11 by means of a suitable conduit 12 and pump 13.

The drum 10 preferably also has an imperforate discharge section 10b joined end to end with the advance perforate section 10a, the two sections being mounted for rotation in any suitable manner( not shown) and being equipped with suitable drive means, such as an electric motor 14, transmission 15, and belt drive arrangement 16.

An advantageous degree of perforation has been found to be the provision of holes approximately one-eighth of an inch in diameter spaced approximately three-sixteenths of an inch apart, regardless of the dimensions of the drum in any given installation.

The drum 10 is mounted to revolve above a whey-catching trough 17, which discharges into any suitable disposal system, for example, a whey pan 18 provided with a conduit 19 leading to conventional whey-drying equipment.

The imperforate discharge section 10b of the drum 10 is provided merely as a conduit for passing the suitably drained curds from the perforate section 10a to the salting stage of the process.

Salting of the prepared curds is accomplished with great efficiency and uniformity by flowing the curds continuously from the discharge section 10b of the drum into a funnel structure 20 leading through the floor 21 of the plant and opening into the path of movement 22, Fig. 1, of a plurality of tubular forming receptacles 23, while, at the same time, flowing into the funnel 20 a continuous stream of salt. The latter is advantageously accomplished by means of a vibrating conveyer 24 having its discharge directed over the funnel structure 20 and supplied with salt in any suitable manner, for example, by manually emptying bags of salt onto the supply end of the conveyer.

Each of the tubular forming receptacles 23 has a length determined by working area available. As illustrated, the receptacles 23 hang pendant from a suspension trackway 25 of endless loop configuration, such trackway being secured to the ceiling face of the floor structure 21 dividing the lower story 26 from the upper story 27 of the cheese-making plant, and the forming receptacles 23 have a length such as will permit the swinging of same to a convenient, inclined, discharge position, such as that illustrated in Fig. 3, where a work table 39 serves to support such receptacle in inclined position during the cut off and discharge of increments of the fully formed and knit cheese mass.

The lower end portion of each forming receptacle 23 is constructed to enable the discharging cheese mass to be appropriately cut in increments suitable for immediate insertion in standard dressed cheese hoops 28, Fig. 3. Thus, as illustrated in detail in Figs. 4 and 5, a cheese-supporting, cut-off knife 29 is pivoted at 30 to the forming receptacle proper on an axis parallel with the longitudinal axis of such forming receptacle for swinging inwardly and outwardly of the receptacle through a slot 31. A correspondingly tubular extension 32 of the lower end of the receptacle is telescoped on the latter for longitudinal adjustment relative to the receptacle proper, as by means of mounting and adjusting screws 33. A second cheese-supporting, cut-off knife 34 is provided in the receptacle extension 32 in a manner corresponding to that of the first knife 29, for swinging inwardly and outwardly of such receptacle through a slot 35. The knives 29 and 34 are provided with handles 36 and 37, respectively, so that they may be easily operated manually during the cutting off and discharge of cheese increments as indicated in Fig. 3.

In the carrying out of my process, a forming receptacle 23 is spotted directly under the discharge spout 20a of the funnel structure 20, and is filled with salted curd by reason of the continuous and simultaneous flow into the funnel structure of the drained curds on the one hand, and of the salt, on the other. It will be noted that the gravity flow of the curds in substantially discrete form, as they are following drainage in the revolving drum 10, together with the salt, accomplishes a peculiarly effective distribution of the salt throughout the mass of curds deposited in the forming receptacle. In order to eliminate any whey which may be squeezed from the mass by reason of the weight of the column thereof in the forming receptacle, the walls thereof are desirably sparsely perforated, somewhat as indicated at 38. While it is not here shown as such, these perforations may also be provided in the extension 32 of the forming receptacles.

The filling operation may be carried out either with the upper knife 29 or the lower knife 34 thrown across the receptacle as the cheese-supporting bottom thereof. Where the receptacle extension is perforated, it is preferable that the receptacle be filled while the lower knife 34 provides such bottom. The first cheese increment is then cut off by throwing the upper knife 29 into position across the interior of the receptacle, and is discharged by throwing the lower knife 34 out of its cheese-supporting position at the same time that the upper knife 29 is in its said cheese-supporting position.

Subsequent cheese increments are successively cut off and discharged by throwing the lower knife 34 back into cheese-supporting position, then throwing the upper knife 29 out of cheese-supporting position to permit the consolidated cheese column to slide down into supported position on the lower knife 34, and thereafter throwing the upper knife across the interior of the receptacle to cut off another cheese increment, and thereafter throwing the lower knife outwardly of the receptacle to permit discharge of the theretofore cut off increment.

While it is not necessary to have a closed loop trackway for the several receptacles 23, it is preferred to do so, and to provide the filling and discharge stages of the apparatus adjacent each other, as indicated in Fig. 1, so that the filled receptacles can be progressively advanced about the circuit during the time required for forming and knitting of the cheese column to be fully accomplished. Thus, each receptacle is filled with the salted curds at the filling stage and is progressively advanced to the discharge stage in a semi-continuous fashion involving a minimum of manual labor and supervision.

The present apparatus is arranged for manual advance of the several receptacles about the trackway in the intermittent fashion required by the periods of activity at the filling and discharge stations, respectively. Nevertheless, it can be appreciated that appropriate arrangements can be made for intermittent or suitably controlled progressive movement of the receptacles by a variety of mechanical means, thereby further eliminating manual labor.

While the tubular forming receptacle here illustrated is circular in cross-section, the term "tubular" is used broadly herein. The cross-sectional configuration may be as desired or found appropriate in any given instance. The designation in the claims of the revolving drum 10 as being "horizontally disposed" obviously includes the inclined positioning illustrated, whereby the material is advanced along the length of the drum under the influence of gravity.

Whereas this invention is here illustrated and described with respect to particular preferred apparatus for carrying out the process, various changes may be made without departing from the scope of the inventive teachings hereof as defined by the following claims.

I claim:

1. In a granular curd process of making cheese, the steps, following the customary making of curds and whey in a vat, of separating the curds and whey; introducing the curds into the upper end of an elongate, vertically disposed, forming tube in a continuously flowing stream; simultaneously flowing a continuous stream of salt into said upper end of the tube, so that the curd and salt commingle as they fall into said tube and form a salted curd column therewithin; and retaining the mixed curd and salt within said tube until formed and knit into a cohesive cheese body.

2. In a granular curd process of making cheese, the steps, following the customary making of curds and whey in a vat, of introducing the mixed curds and whey from the vat into the upper end of a perforated, inclined, revolving drum; and passing the curds through said drum and out the lower end thereof by operation of the force of gravity, for draining the whey from the curds.

3. In a cheese-making plant, cheese-making apparatus comprising a perforated drum; means mounting said drum for rotation on an axis inclined to the horizontal; an endless loop trackway disposed below and traversing the lower end of said drum; a series of elongate tubular receptacles suspended vertically from said trackway so as to be movable therearound, said receptacles having their upper ends open and their lower ends normally closed by cut-off mechanism; feeding means for salt disposed closely adjacent the lower end of said drum; and means for feeding mixed curds and whey into the upper end of said drum for passage therethrough and for discharge into a receptacle spotted beneath the lower end of said drum.

4. Cheese-making apparatus, comprising a perforated tumbling drum; means mounting said drum for rotation on an axis inclined to the horizontal; means for continuously feeding a mixture of curds and whey into the raised end of said drum; and means defining a discharge opening at the lower end of the drum.

5. In a cheese-making plant, an endless loop trackway; a series of elongate tubular receptacles suspended vertically from said trackway so as to be movable therearound, said receptacles having their upper ends open and their lower ends normally closed by cut-off mechanism; and means stationed above said trackway for successively feeding curd into the open upper ends of said receptacles, respectively, as they are individually spotted beneath said means.

6. The combination recited in claim 5, wherein there is additonally stationed above the trackway means operably adjacent the curd feeding means for feeding salt simultaneously with the feed of curd and into the same receptacle.

References Cited in the file of this patent

UNITED STATES PATENTS

| Number | Name | Date |
|---|---|---|
| 31,834 | Stone | Mar. 26, 1861 |
| 1,475,398 | Kielsmeier | Nov. 27, 1923 |
| 2,272,954 | Sartori | Feb. 10, 1942 |
| 2,366,553 | Petersen | Jan. 2, 1945 |
| 2,505,984 | Miollis | May 2, 1950 |
| 2,544,672 | Greer et al. | Mar. 13, 1951 |
| 2,574,508 | Strezynski | Nov. 13, 1951 |
| 2,657,993 | Arkin | Nov. 3, 1953 |

OTHER REFERENCES

Food Manufacture, vol. 28, No. 10, Oct. 1, 1953, pp. 404 to 406.